May 7, 1968   E. J. SICKLESTEEL   3,381,421
FOLDING UNIT FOR TRAILERS, MOBILE HOMES AND THE LIKE
Filed May 23, 1966   3 Sheets-Sheet 1
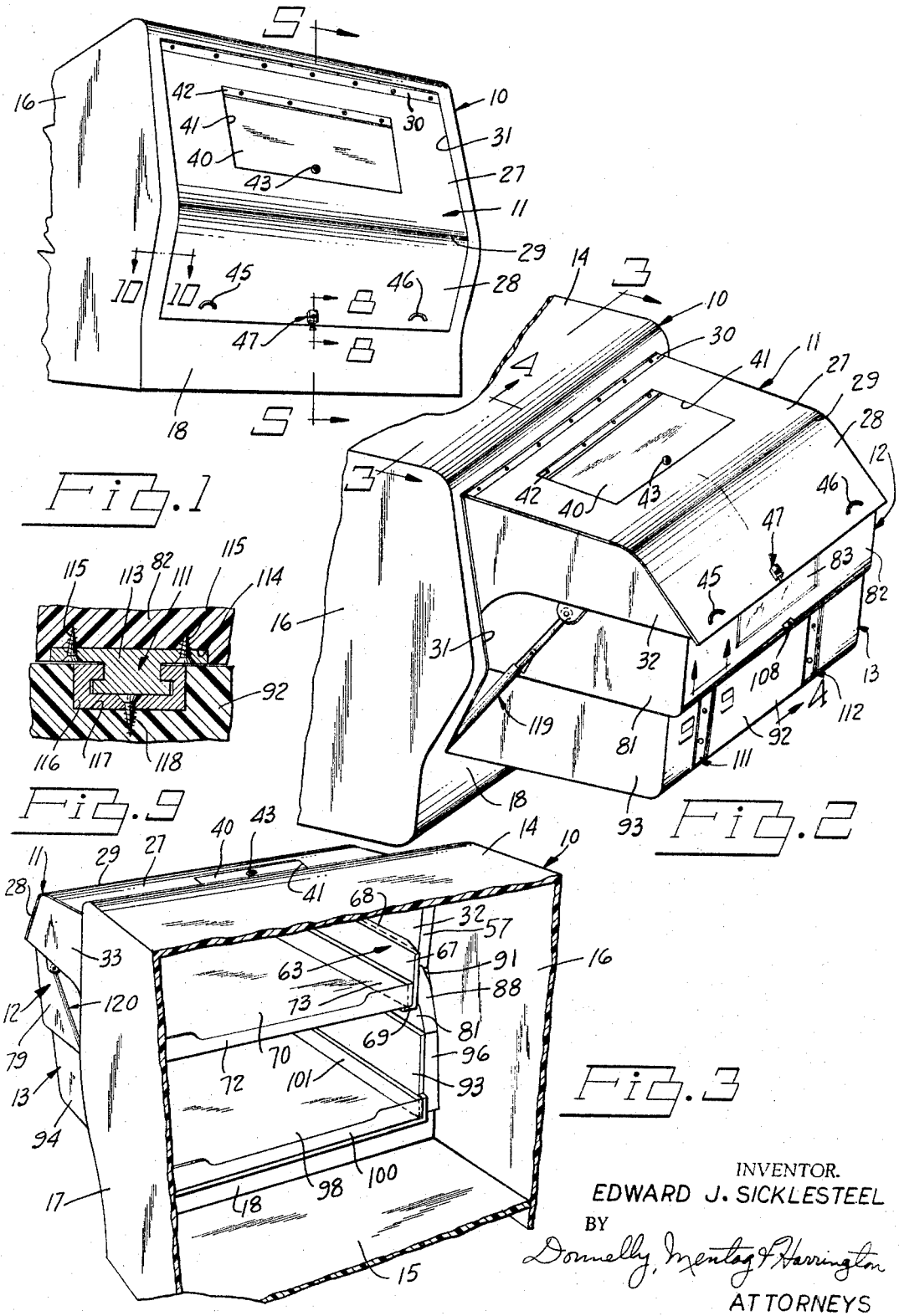
INVENTOR.
EDWARD J. SICKLESTEEL
BY
Donnelly, Mentag & Harrington
ATTORNEYS

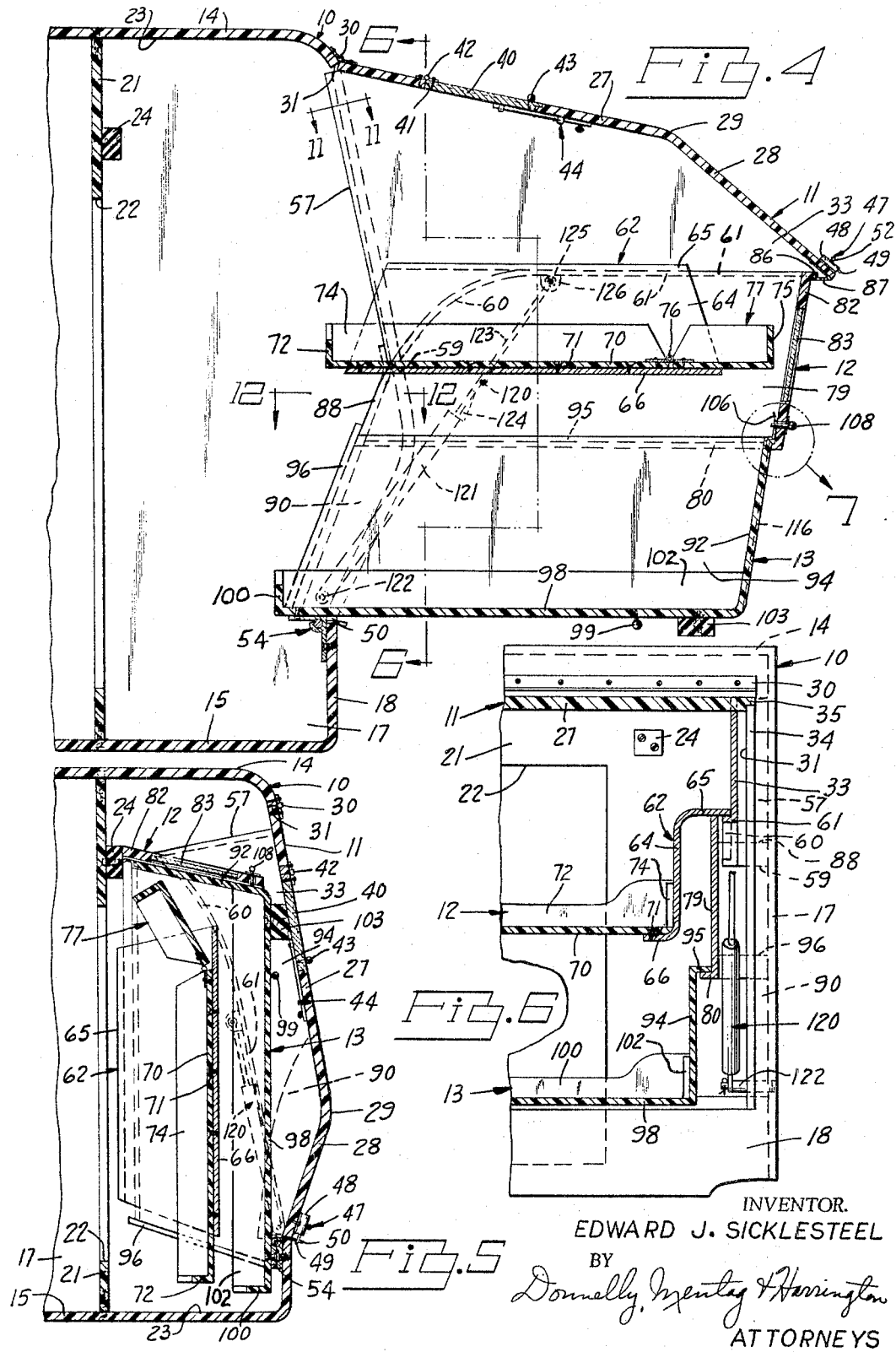

May 7, 1968   E. J. SICKLESTEEL   3,381,421
FOLDING UNIT FOR TRAILERS, MOBILE HOMES AND THE LIKE
Filed May 23, 1966  3 Sheets-Sheet 3
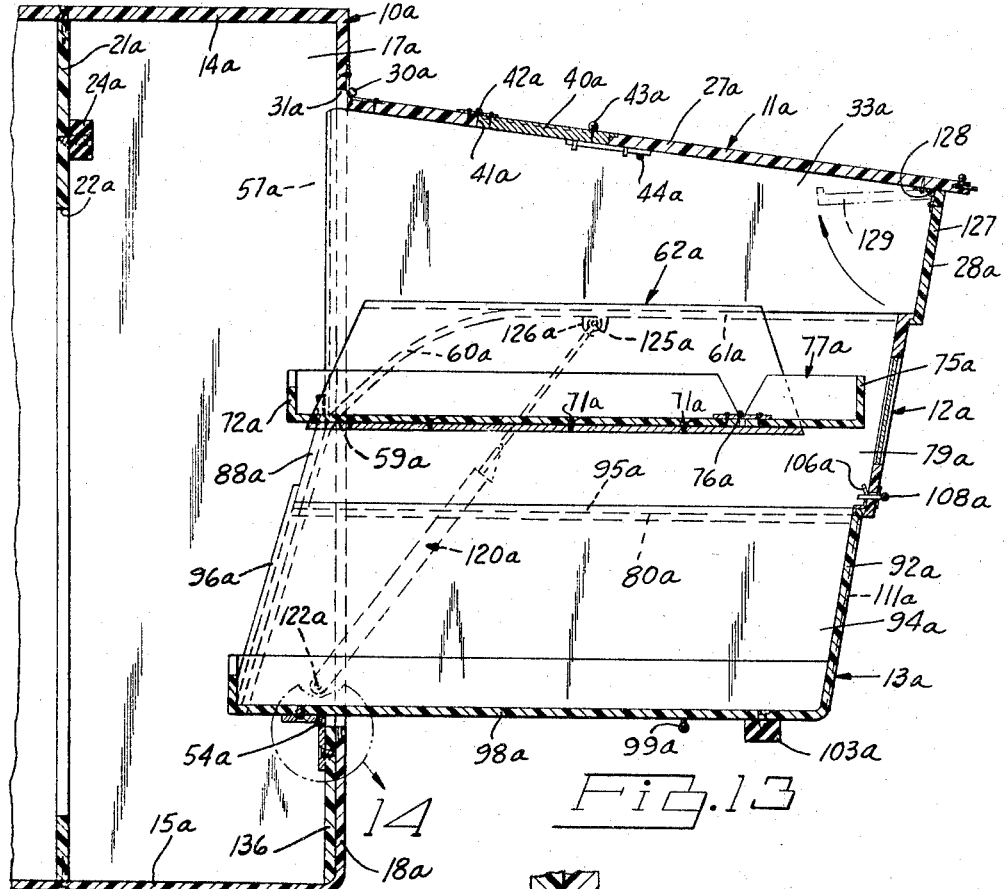
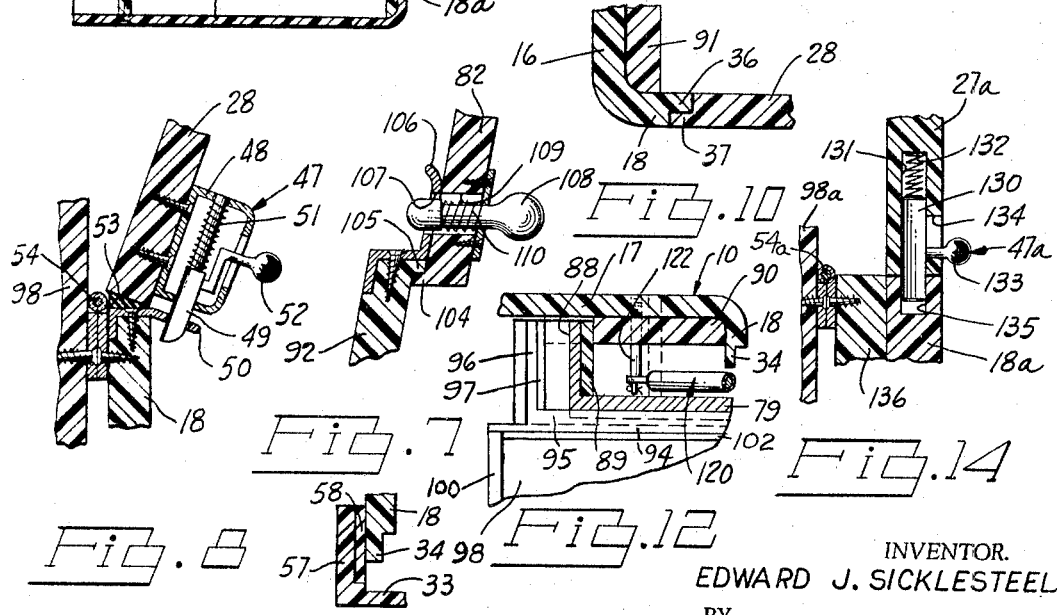
INVENTOR.
EDWARD J. SICKLESTEEL
BY
Donnelly, Mentag & Harrington
ATTORNEYS

United States Patent Office 3,381,421
Patented May 7, 1968

3,381,421
FOLDING UNIT FOR TRAILERS, MOBILE HOMES AND THE LIKE
Edward J. Sicklesteel, 1811 Mayfield, Livonia, Mich. 48152
Filed May 23, 1966, Ser. No. 552,203
16 Claims. (Cl. 52—36)

This invention relates to a fold-out unit which is adapted to enlarge the usable area of a movable recreational vehicle or a stationary structure as, for example, a travel trailer, a mobile home, a pick-up truck camper, a motor home, a houseboat, a cottage, a home, a cabin, or the like.

The use of travel trailers, pick-up truck campers and the like has increased greatly in the past few years. The increased use of such recreational vehicles has created a demand for enlarged vehicles which can accommodate an increased number of persons. However, there are many pratical restrictions which limit the size of such vehicles as, for example, highway restrictions and other restrictions due to costs, maneuverability, and so forth. In view of the foregoing, it is an important object of the present invention to provide a novel and improved fold-out unit which may be incorporated in a movable vehicle or stationary structure to enlarge the usable area of the vehicle or structure when in use, and which may be quickly and easily folded up when not in use for transportation purposes, or for storage purposes when it is in a stationary structure.

It is another object of the present invention to provide a novel and improved fold-out unit for use in conjunction with recreational vehicles such as travel trailers, pick-up truck campers, motor homes, mobile homes, houseboats, and which can be made to any desired size for use in stationary structures such as cottages, homes, cabins or the like.

It is a further object of the present invention to provide a novel and improved fold-out unit which is adapted to increase the usable space in a recreational vehicle or the like, and which allows a reduced size for more convenient traveling.

It is still another object of the present invention to provide a novel and improved fold-out unit which is self-supporting from the structure in which it is incorporated, and which is completely locked automatically when it is in the folded-out or open position.

It is still a further object of the present invention to provide a novel and improved fold-out unit which is completely insulated and sealed when in the folded-out or open position, and which may be operated between the folded and open positions by one person in an easy manner, and in two simple operations.

It is still another object of the present invention to provide a novel and improved fold-out unit which folds out quickly and easily to set up two double beds ready for use, and which exposes a sufficient floor space when it is in the folded-out or open position to form a compartment or room which may be used as a dressing room with normal head room or clearance, thereby increasing the useful space in the structure in which the fold-out unit is mounted. When the unit is in the folded position, the mattresses and bedding fold and store in a position ready for travel without any storing, tieing or moving operations of the mattresses and bedding being necessary.

It is still another object of the present invention to provide a folding unit which makes for a shorter towing vehicle that presents less area to wind, and which is lighter in weight than a comparable area in a regular vehicle and which is less costly.

It is still a further object of the present invention to provide a novel and improved fold-out unit which may be used in recreational vehicles or stationary structures and which comprises three sections or units that fold and nest together in the folded or stored positon and which are adapted to be expanded to an interlocking unit which is completely enclosed and sealed against the weather.

Other objects, features and advantages of this invention will be apparent from the following detailed description, appended claims, and the accompanying drawings.

In the drawings:

FIG. 1 is a perspective view of a fragmentary portion of a trailer body provided with a fold-out unit made in accordance with the principles of the present invention;

FIG. 2 is a perspective view of the structure illustrated in FIG. 1 and showing the fold-out unit in the open or folded out position;

FIG. 3 is an elevational section view of the structure illustrated in FIG. 2, taken along the line 3—3 thereof, and looking in the direction of the arrows;

FIG. 4 is an enlarged, fragmentary, elevational section view of the structure illustrated in FIG. 2, taken along the line 4—4 thereof, and looking in the direction of the arrows;

FIG. 5 is a slightly enlarged, fragmentary, elevational section view of the structure illustrated in FIG. 1, taken along the line 5—5 thereof, and looking in the direction of the arrows;

FIG. 6 is a fragmentary, elevational section view of the structure illustrated in FIG. 4, taken along the line 6—6 thereof, and looking in the direction of the arrows;

FIG. 7 is an enlarged, fragmentary section view of the structure shown within the circle marked "7" in FIG. 4;

FIG. 8 is an enlarged, fragmentary, elevational section view of the structure illustrated in FIG. 1, taken along the line 8—8 thereof, and looking in the direction of the arrows;

FIG. 9 is an enlarged, fragmentary, horizontal section view of the structure illustrated in FIG. 2, taken along the line 9—9 of FIG. 2, and looking in the direction of the arrows;

FIG. 10 is an enlarged, fragmentary, horizontal section view of the structure illustrated in FIG. 1, taken along the line 10—10 thereof, and looking in the direction of the arrows;

FIG. 11 is an enlarged, fragmentary, sectional view of the structure illustrated in FIG. 4, taken along the line 11—11 thereof, and looking in the direction of the arrows;

FIG. 12 is an enlarged, fragmentary, sectional view of the structure illustrative in FIG. 4, taken along the line 12—12 thereof, and looking in the direction of the arrows;

FIG. 13 is a fragmentary, elevational section view, similar to that of FIG. 4, but showing a second embodiment of the invention; and, FIG. 14 is an enlarged, elevational section view of the structure shown within the circle "14" in FIG. 13, and showing the latching structure for securing the roof and door section of the second embodiment in place when the unit is in the folded position.

Referring now to the drawings, and in particular to the FIGS. 1, 2 and 3, the numeral 10 generally designates an illustrative structure provided with a fold-out unit made in accordance with the principles of the present invention. The illustrative structure 10 comprises the rear end of a travel trailer. However, it will be understood that this is only an illustration of the use of the fold-out unit of the present invention, and that the invention can be incorporated in other movable vehicles and also in stationary structures. For example, the fold-out unit of the present invention may be used in conjunction with recreational vehicles such as travel trailers, pick-up truck campers, motor homes, mobile homes, houseboats, and stationary structures such as cottages, homes, cabins and the like.

As shown in FIGS. 2 and 3, the illustrative fold-out unit comprises a top or roof and door section generally indicated by the numeral 11, a center section generally indicated by the numeral 12, and a bottom section generally indicated by the numeral 13. The center and bottom sections 12 and 13, respectively, are illustrated as bed-carrying sections. However, it will be understood that the beds or bunks may be deleted and the space in the fold-out unit used for other purposes.

As best seen in FIG. 3, the travel trailer portion 10 includes a top wall 14, a bottom wall 15, and left and right side walls 16 and 17, respectively. For purposes of illustration these walls have been shown as being integrally formed, but it will be understood that any suitable wall construction may be used in the structure in which the fold-out unit is mounted. The rear end of the travel trailer portion 10 is enclosed by a contoured wall 18. As shown in FIG. 5, the fold-out unit is in the folded or closed position in a compartment which is enclosed on the front side thereof by a transverse wall 21 which has an access opening or door 22 formed therethrough.

As shown in FIG. 4, the compartment formed by the walls 14, 15, 16, 17, 18 and 21, into which the fold-out unit is folded when not in use, is indicated by the numeral 23. The compartment 23 is usable for other purposes when the fold-out unit is in the opened or folded out position. The compartment 23 thus adds additional usable space to the trailer body which can be used as a dressing area or for other purposes. As shown in FIGS. 4, 5 and 6, a bumper 24 is mounted on the right side of the trailer, on the rear side of the wall 21, which is engaged by the unit when it is in the stored position. The left side of the trailer would be provided with a similar bumper. It will be understood that additional bumpers 24 may be provided as desired.

As best seen in FIGS. 2 and 4, the top section roof and door section 11 includes an enclosure panel which is adapted to function as a roof when the unit is in the folded out or opened position and as a door when the unit is in the folded or stored position shown in FIGS. 1 and 5. The enclosure panel of the top section 11 includes an upper portion 27 which is connected to a lower portion 28 by an arcuate connector portion 29. The panel portions 27 and 28 are formed so as to provide a contoured panel shaped to mate with the contoured trailer rear wall 18.

The enclosure panel of the top section 11 is adapted to enclose the opening 31 formed in the trailer rear wall 18, as shown in FIG. 1, when the unit is in the folded or closed position. The upper end of the panel portion 27 is hinged in place along the upper end of the door opening 31 by any suitable means, as by the spring-type hinge 30 which is adapted to hold the top section 11 in the open position until the other sections 12 and 13 have been engaged with it and locked in place. It will be understood that any suitable equalizing mechanism may be used instead of the spring-type hinge 30 as, for example, a torsion bar.

As shown in FIG. 2, the top section 11 is provided with a left side wall 32. As shown in FIG. 4, the top section 11 is also provided with a right side wall 33. The side walls 32 and 33 are adapted to be connected to the enclosure panel portions 27 and 28 by any suitable means. It will be understood that the top section 11, the center section 12 and the bottom section 13, may be formed from any suitable material, as for example, wood, or metal, or it may be molded as a complete unit from a suitable plastic material.

As shown in FIG. 6, the door opening 31 in the trailer rear wall 18 is provided with an inwardly extended flange 34 along the right side thereof which is adapted to be overlapped by the outwardly extended flange 35 formed along the right edge of the enclosure panel portions 27, 28 and 29 of the top section 11 when the unit is in the stored position. As shown in FIG. 10 the left side of the door opening 31 is also bounded by an inwardly extended flange 36 which is adapted to be overlapped and mated with the outwardly extended flange 37 on the left side of the enclosure panel of the top section 11, when the unit is in the folded position.

As shown in FIGS. 1 and 4, the top section panel portion 27 is provided with a suitable window 40 which is mounted in a window opening 41 and hinged in place by a suitable hinge 42. The window 40 is provided with a knob 43 for opening and closing the same. As shown in FIG. 4, the window 40 is provided with a suitable locking bolt means, generally indicated by the numeral 44. The window 40 may be provided with suitable sealing means around the periphery thereof. As shown in FIG. 1, the top section 11 is provided with a pair of suitable handles 45 and 46 for manual opening and closing of this section.

As shown in FIGS. 5 and 8, the top section 11 is provided with a suitable spring-loaded catch, generally indicated by the numeral 47, for retaining the top section 11 in the closed or stored position. As shown in detail in FIG. 8, the catch 47 includes a suitable housing 48 in which is slidably mounted a bolt 49 that extends downwardly and engages an aperture in a mating catch plate 50 which is fixed to the trailer wall 18 at the lower end of the door opening 31. The catch 47 is provided with a suitable spring 51 which maintains the lock bolt 49 in the normal downwardly extended locking position shown in FIG. 8. The lock bolt 49 may be moved upwardly by the manual operator knob 52 which is connected to the bolt 49 by any suitable means. A suitable sealing means is operatively mounted along the lower end of the door opening 31 on the wall 18 and it abuts the hinge 54. It will be seen that the top section 11 may be quickly and easily opened by moving the bolt 49 upwardly to release it from the catch plate 50, whereby the top section 11 may be swung counter-clockwise to the open position shown in FIGS. 2 and 4.

As shown in FIGS. 4 and 11, the top section right side wall 33 is provided with an outwardly extended flange 57 which is provided with a suitable sealing material 58 on the rear side thereof and which functions as a sealing flange or sealing piece to sealingly engage the inner side of the rear wall 18 along the door opening 31. As shown in FIG. 4, the right side wall 33 is formed with a downwardly extended portion at the front end thereof which terminates at the point indicated by the numeral 59. The flange 57 would be formed to terminate at the lower end of the downwardly extended portion of the wall 33. It will be understood that the left side wall 32 is similarly formed and provided with a similar sealing flange for engagement with the trailer rear wall 18 along the left side of the door opening 31 in a similar manner.

As shown in FIG. 4, the right side wall 33 of the top section 11 is provided with a carrier track along the lower edge thereof indicated by the numerals 60 and 61. The numeral 60 indicates the portion of the track which is curved and formed along the curved, downwardly extended front end portion of the wall 33, and the numeral 61 indicates the portion of the track formed along the straight lower edge of the rear end of the wall 33, so as to form a horizontal track portion at that point. The left side of the top section 11 is provided with a similar carrier flange or track on the lower end of the wall 32.

The center section 12 includes a bed carrier member, generally indicated by the numeral 62, on the right side thereof as shown in FIG. 6, and a similar bed carrier member 63 on the left side thereof, as shown in FIG. 3. As shown in FIG. 6, the carrier member 62 is formed as a metal tray comprising a vertical plate 64 on the upper end of which is formed an integral, outwardly extended, horizontal flange 65. A horizontal, inwardly extended flange 66 is integrally formed on the lower end of the vertical plate 64. The outer end of the top horizontal flange 65 is adapted to ride on the aforementioned track portions 60 and 61 formed on the top section right side wall 33, as more fully described hereinafter. As shown in FIG. 3, the left side carrier member or metal tray 63 is also provided with a vertical plate 67 and an outwardly extended, horizontal, integral flange 68 on the upper end thereof, and a similar horizontal, integral, inwardly extended flange 69 on the lower end thereof. The left side flange 68 is also adapted to operatively engage a track (not shown) formed on the lower end of the left side wall 32 of the top section.

As shown in FIGS. 3, 4 and 6, a center section 12 is adapted to carry a bed or bunk which includes a bottom panel 70 that is supported on the sides thereof by the horizontal, inwardly extended flanges 66 and 69 of the carrier members 62 and 63, respectively. The panel 70 may be secured to the flanges 66 and 69 by suitable means, as by the screws 71 which are shown in FIGS. 4 and 6. The bunk in the center section 12 is shown as provided with a front contoured end board 72, a left side board 73, a right side board 74 and a rear board 75. The rear end of the bunk in the center section 12 is separately formed, as shown in FIG. 4, and is hinged to the front end of the bunk by the piano hinge 76. The hinged rear end of the bunk is generally indicated by the numeral 77 and is adapted to be swung to the position shown in FIG. 5 when the folding unit is moved to the stored position.

As shown in FIG. 6, the center section 12 further includes a right side wall 79 having an inwardly extended, horizontal flange 80 formed on the lower side thereof. The center section 12 is further provided with the left side wall 81 and a rear wall 82, as shown in FIG. 2. The left side wall 81 is provided with a flange on the lower side thereof similar to the flange 80 on the right side wall 79. As shown in FIGS. 2 and 4, the center section rear wall 82 is provided with a fixedly mounted window 83.

As shown in FIG. 4, the rear wall 82 of the center section 12 is provided with an outwardly extended flange 86 along the upper edge thereof which is adapted to be seated on and supported by the inwardly extended flange 87 formed on the lower edge of the top section panel portion 28.

The center section 12 may be provided with any suitable sealing means along the sides thereof so as to sealingly engage the trailer rear wall 18 along the side edges of the door opening 31. For example, the center section side wall 79 may be provided with an outwardly extended flange 88 which extends upwardly and is formed so as to overlap and engage with the flange 57 on the top section 12. As shown in FIG. 12, the profile flange 88 may be provided with a suitable sealing means 89 which is adapted to engage a profile sealing member 90 seated on the inside of the trailer side wall 17 and secured thereto by any suitable means. The profile sealing member 90 would be shaped on the rear end thereof in accordance with the contour of the rear wall 18 of the trailer and along the front end thereof in accordance with the front edge of the side wall 79 of the center section 12. As shown in FIG. 10, the left side of the trailer is provided with a similar profile sealing piece 91 which would be engaged by the sealing flange on the left side wall 81 of the center section 12 in the same manner as described for the flange 88 on the right side of the section 12.

As shown in FIG. 2, the bottom section 13 includes a rear wall 92 and a left side wall 93. The bottom section 13 is further provided with a right side wall 94, as shown in FIG. 4. As shown in FIGS. 4 and 6, the bottom section right side wall 94 is provided with an outwardly extended, horizontal flange 95 which is adapted to be seated on and carried by the horizontal, inwardly extended flange 80 on the right side wall 79 of the center section 12. As shown in FIGS. 4 and 12, the bottom section right side wall 94 is provided with an outwardly extended flange 96 on the front end thereof, which is provided with a suitable sealing strip 97 for sealingly engaging the contoured sealing piece 90 on the right side of the trailer. The upper end of the flange 96 is preferably formed so as to overlap the lower end of the flange 88 on the center section 12. The left side of the bottom section 13 would be provided with a suitable sealing flange means for sealing the left side of the bottom section 12 at that point. The left side wall 93 of the bottom section 13 is provided with a flange along the upper edge thereof similar to the flange 95 on the right side wall 94 for supporting engagement by a flange on the lower end of the left side wall 81 of the center section 12 in the same manner as the flange 80 on the wall 79 of the center section 12.

The bottom section 13 is provided with a bottom wall 98 which forms the bottom panel for the lower bed or bunk. As shown in FIG. 3, the lower bunk is provided with a contoured board 100 along the front end thereof. As shown in FIG. 4, the bottom panel 98 on the lower bunk is operatively secured to the trailer rear end wall 18 by the piano hinge 54. As shown in FIG. 3, the lower bunk includes a left side board 101. As shown in FIG. 6, the lower bunk also includes a right side board 102. The bunk boards, 100, 101 and 102 may be secured to the lower section side and bottom walls by any suitable means. As shown in FIG. 4, the lower section 13 is provided with a handle 99 and a suitable bumper 103.

As shown in FIGS. 4 and 7, the center section 12 is adapted to be releasably secured to the bottom section 13 when the unit is in the open position by a spring biased locking bolt. As best seen in FIG. 7, the rear wall 92 of the bottom section 13 is provided with an outwardly extended flange 105 along the upper edge thereof which is adapted to be carried by the inwardly extended flange 104 on the lower end of the rear wall 82 of the center section 12, when the unit is in the open position shown in FIG. 4. A lock plate 106 is fixed on the upper end of the wall 92 and is provided with a hole 107 through which is received the inner end of the locking bolt 108. A spring 110 is mounted on the lock bolt 108 and is adapted to normally bias the lock bolt 108 inwardly. The locking bolt 108 and the spring 110 are operatively mounted in the hole 109 formed through the lower end of the center section wall 82. The bolt 108 would be pulled outwardly to the released position when the unit is to be moved to the stored position to permit the bottom section 13 to be nested into the center section 12, as shown in FIG. 5.

As shown in FIG. 2, the folding unit of the present invention is provided with a pair of track means, generally indicated by the numerals 111 and 112, for slidably interconnecting the center section 12 with the bottom section 13. The details of the track means 111 and 112 are identical, and accordingly, the details of only one has been illustrated in FIG. 9.

As shown in FIG. 9, the track means 111 includes an elongated T-shaped strip member 113 which is fixedly mounted in the vertically extended recess 114 formed in the inside surface of the rear wall 82 of the center section 12. The T-shaped strip 113 is adapted to be secured in place by any suitable means, as by the screws 115. The track means 111 further includes the mating strip portion 116 which is provided with the T-shaped recess along the outer face thereof that is adapted to slidably receive the T-shaped track member 113. The T-shaped recess strip 116 is seated in the recess 117 formed in the outer face of the bottom section rear wall 92 and secured in place by any suitable means, as by the screws 118. It will be seen that when the center section 12 and the bottom section 13 are swung simultaneously from the open position of FIG. 4 to the stored position of FIG. 5, that the bottom section 13 will telescopically move into the center section 12 and be guided therein by the track means 111 and 112 into the nested position shown in FIG. 5. It will be understood, that the track or guide means 111 and 112 may be mounted in locations other than that shown. For example, track means may be provided on each side of the center and bottom sections of the folding unit. Also, any number of track or guide means may be employed.

As shown in FIG. 2, the folding unit is provided on the left side thereof with a suitable telescoping support member, generally indicated by the numeral 119, which is adapted to give additional support to the folding unit when it is in the open position. A similar support member 120 is mounted on the right side of the folding unit, as shown in FIGS. 4 and 12.

As shown in FIG. 4, the support member 120 is provided with a lower cylindrical member 121 that is hinged at the point 122 to the trailer right side wall 17 as shown in FIG. 12. The upper end of the support member 120 includes a rod 123 which has the lower end slidably mounted in the cylinder 121 and the upper end hinged at the point 125 on the bracket 126 that is fixed to the lower side of the track 61 formed on the right side wall 33 of the top section 11. As shown in FIG. 4, the telescoping support member 120 is provided with a spring biased latch 124 which is adapted to be normally extended outward from the rod 123, and to engage against the upper end of the tubular portion or cylinder 121 to retain the support member 120 in the open position. To release the support member 120, the latch 124 is pressed inwardly so as to permit the rod 123 to be telescopically nested inside of the tubular member 121 when the unit is in the folded position, as shown in FIG. 5. The support member 119 operates in the same manner.

In use, the folding unit of the present invention would be disposed in the position shown in FIG. 5 for transportation purposes if it is mounted in a movable vehicle, or for storage purposes if it is mounted in a stationary structure, as a house or the like. When it is desired to move the folding unit to the open position, the top section 11 is first swung from the closed position of FIG. 1 to the open position of FIG. 4. The center and bottom sections 12 and 13, respectively, are then swung clockwise from the folded position shown in FIG. 5 to the open position shown in FIG. 4, whereby the lower section 13 slides downwardly and outwardly from the center section 12 as these two sections are swung to the open position of FIG. 4.

It will be understood that any suitable mattresses and bedding may be used in the beds or bunks formed in the center and bottom sections 12 and 13. It will also be understood that the bedding can stay in position on the beds when the unit is folded in, since the bedding and the mattresses are pressed together and are held in place so that they need not be tied down when the unit is moved to the folded position of FIG. 5.

FIG. 13 illustrates a modified folding unit made in accordance with the principles of the present invention. The parts of the folding unit of FIG. 13 which are the same as the folding unit of the first embodiment of FIGS. 1 through 12 have been marked with the same reference numbers followed by the small letter *a*.

The embodiment of FIG. 12 illustrates that the top section 11*a* may be provided with a continuous flat panel 27*a* instead of a contoured panel so as to enclose the opening 31*a* in a straight or vertical rear wall 18*a* of a trailer structure 10*a*. The embodiment of FIG. 13 is also provided with a swingably mounted rear end wall 127 which is secured by a hinge 128, at the upper end thereof, to the lower end of the top section panel 27*a*. When the folding unit of FIG. 13 is to be moved to the closed position, the rear end wall 127 is first swung clockwise, as indicated by the dotted line position 129, to a folded position against the inner side of the panel 27*a*. Suitable sealing means are provided along the side edges of the rear end wall 127.

As shown in FIG. 14, the panel 27*a* of the top section 11*a* would be locked in place when the unit is in the folded position by a locking bolt means, generally indicated by the numeral 47*a*, which operates in a manner similar to that of the locking means 47 of the first embodiment. As shown in FIG. 14, the lower end of the top section panel 27*a* is provided with a hole 131 in which is slidably mounted a lock bolt 130. A spring 132 normally biases the bolt 130 downwardly into a mating hole 135 formed in the upper end of the trailer rear wall 18*a*. A manually operated handle 133 extends outwardly through a hole 134 to permit the bolt 130 to be moved manually upward so that the folding unit can be moved to the open position of FIG. 13. The embodiment of FIG. 13 operates in the same manner as the first described embodiment of FIGS. 1 through 12.

It will be understood that additional support jacks or blocks may be put under the unit when it is in the open position, if desired. Also, other suitable mechanical means as linkage arms, cables, or other power means, may be employed to move the folding units between the stored and the open positions, if desired. It will be seen that the weight or load of the folding unit is carried by the roof hinge 30, the flanges formed along the side walls and front walls on the various sections, and by the lower section 13 being secured to the rear wall 18 by the hinge 54.

It will be seen that the folding out operation of the unit may be accomplished by one person in a quick and easy manner. The top section 11 is first moved to the raised position and is automatically held in that position by the hinge 30 or other equalizing mechanism. The center section 12 and bottom section 13 are then swung or lowered from their nested, vertically stored position, and as these sections are swung outwardly, the bed carrier members on the center section engage the track members on the top section 11 and continued movement of these center and bottom sections moves the sections to the interlocking supporting position shown in FIG. 4.

The folding unit of the present invention has been illustrated as being operatively mounted on the rear end of a trailer, but it will be understood that the folding unit may be mounted in other locations on a trailer, as for example on the side of a trailer. The folding unit may be made so as to provide beds of any desired standard or odd size. The various supporting flanges on the folding unit sections are provided with suitable sealing strip means.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a structural folding unit for increasing the usable space in a structure housing having a wall provided with an opening, the combination comprising:
    (a) a top section hingedly mounted on said structure housing in said opening, and swingable between a closed position enclosing said opening and an opened, roof forming position;
    (b) a plurality of folding unit sections disposed beneath the top section in vertically aligned positions when the folding unit is in the folded-out position to form an enclosed enlargement of said structure housing;
    (c) means for slidably supporting the uppermost one of said plurality of folding unit sections on said top section;
    (d) means for supporting the other of said plurality of folding unit sections from said uppermost section;
    (e) means hingedly mounting the lowermost of said plurality of folding unit sections on said structure housing so that the plurality of folding units may be swung through the opening into a folded-in, telescopically nested position in the structure housing, and swung back through the opening into said vertically aligned, folded-out positions under said top section; and, (f) sealing means for sealing said sections relative to each other and said structure housing.

2. A structural folding unit as defined in claim 1, wherein:
   (a) said uppermost folding unit section comprises a center section slidably supported on said top section when the folding unit sections are in the folded-out position; and
   (b) said lowermost folding unit section comprises a bottom section supported by said center section.

3. A structural folding unit as defined in claim 1, including:
   (a) locking means for locking the top section to said uppermost one of said plurality of folding unit sections when the folding unit sections are in the folded-out position.

4. A structural folding unit as defined in claim 1, including:
   (a) locking means for locking the adjacently disposed folding unit sections to each other when they are in the folded-out position.

5. A structural folding unit as defined in claim 1, including:
   (a) supplemental support means connected between said structure housing and the folding unit for providing additional supporting means to the folding unit when it is in the folded-out position.

6. A structural folding unit as defined in claim 5, wherein:
   (a) said supplemental support means includes at least one telescoping, extendable support member having one end connected to the structure housing and the other end connected to the top section.

7. A structural folding unit as defined in claim 1, wherein:
   (a) said means for slidably supporting the uppermost one of said plurality of folding unit sections includes guide tracks for engagement with said uppermost section of said plurality of folding unit sections when they are moved from the folded-in position to the folded-out position to guide the plurality of folding unit sections into the fold-out position under the top section.

8. A structural folding unit as defined in claim 1, wherein:
   (a) each adjacent pair of said plurality of folding unit sections is provided with guide means for guiding the telescopical nesting action of the folding unit sections when they are moved between the fold-out position and the fold-in position.

9. A structural folding unit as defined in claim 1, wherein:
   (a) at least one of said plurality of folding unit sections in provided with a bed.

10. A structural folding unit as defined in claim 1, including:
    (a) means in said structure housing for retaining the plurality of folding until sections in the folded-in position.

11. A structural folding unit as defined in claim 2, wherein:
    (a) said center section includes a pair of carrier members adapted to engage with and be slidably supported by said slidable supporting means on said top section when the center section is swung to the folded-out position;
    (b) said center section further includes a pair of side walls and a rear wall connected to said carrier members;
    (c) the bottom end of said center section is enclosed by said bottom section when the folding unit is in the folded-out position; and
    (d) said center section is adapted to telescopically receive and nest said bottom section when the center and bottom sections are swung from the folded-out position to the folded-in position.

12. A structural folding unit as defined in claim 11, wherein:
    (a) said top section is provided with a pair of side walls; and,
    (b) said slidable supporting means on the top section comprises an inwardly extended track means on each said pair of top section with side walls; and,
    (c) said pair of center section carrier members are operatively supported by said pair of track means.

13. A structural folding unit as defined in claim 11, wherein:
    (a) said center section includes a bed operatively carried by said carrier members.

14. A structural folding unit as defined in claim 11, wherein:
    (a) said bottom section includes a pair of sidewalls, a rear wall and a bottom wall; and,
    (b) said means for supporting the folding unit sections from the uppermost section includes an inwardly extended flange on each center section side wall and an outwardly extended flange along the upper end of each of said bottom section side walls and carried by the flanges on the center section side walls.

15. A structural folding unit as defined in claim 14, wherein:
    (a) said bottom section is provided with a bed.

16. A structural folding unit as defined in claim 1, wherein:
    (a) each of said sections is provided with a stop means to limit the fold-out movement of said sections relative to said structure housing.

References Cited
UNITED STATES PATENTS

| | | | |
|---|---|---|---|
| 2,493,368 | 1/1950 | Smelker | 296—23 |
| 2,856,645 | 10/1958 | Herrmeyer | 296—26 |
| 3,200,545 | 8/1965 | Bunge | 52—67 |

FRANK. L. ABBOTT, *Primary Examiner.*

C. W. ISAACS, *Assistant Examiner.*